July 30, 1935.   C. A. RODMAN   2,009,817
REFRIGERATING AND DISPENSING APPARATUS
Filed June 21, 1934    6 Sheets-Sheet 1

Inventor
Clarence A. Rodman
By Justin W. Macklin
Attorney

July 30, 1935.  C. A. RODMAN  2,009,817
REFRIGERATING AND DISPENSING APPARATUS
Filed June 21, 1934   6 Sheets—Sheet 2
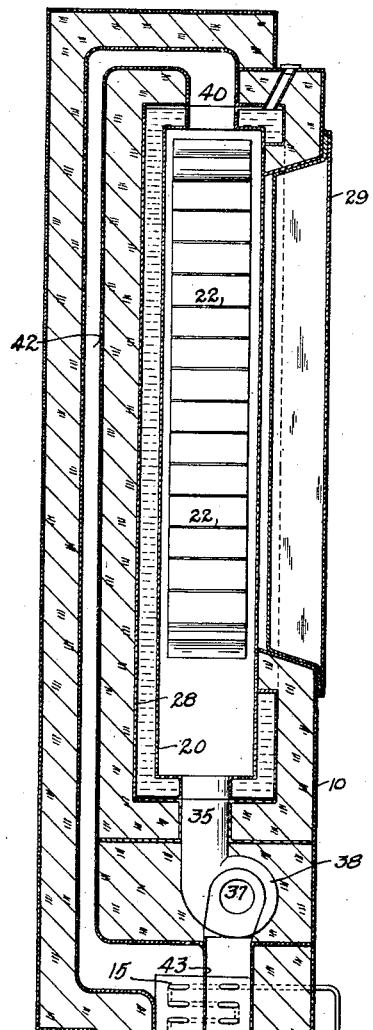
Fig. 3
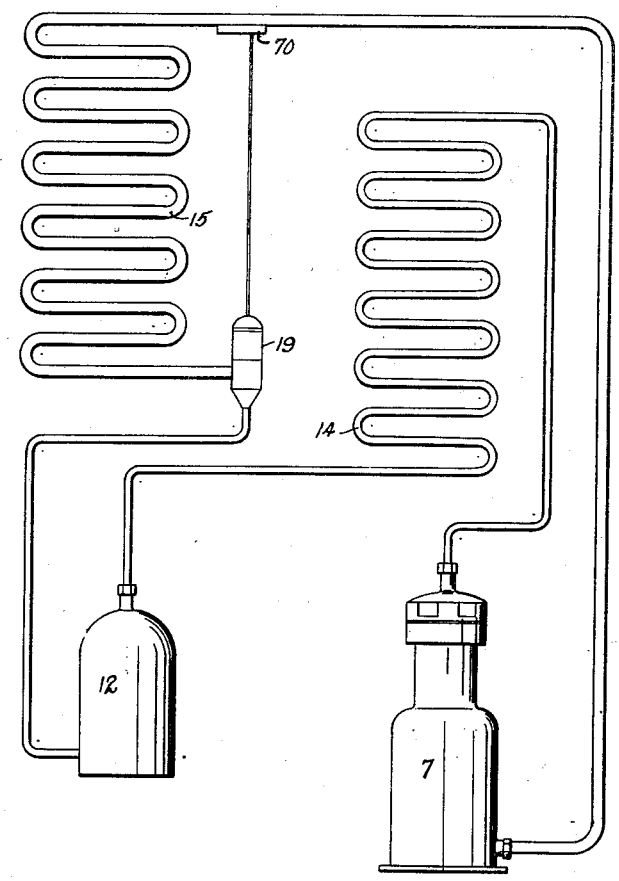
Fig. 4
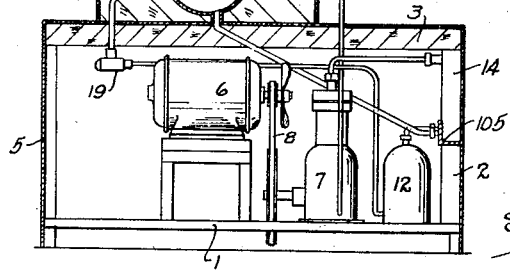
Inventor
Clarence A. Rodman,
By Justin W. Macklin,
Attorney July 30, 1935. C. A. RODMAN 2,009,817
REFRIGERATING AND DISPENSING APPARATUS
Filed June 21, 1934 6 Sheets-Sheet 3

Inventor
Clarence A. Rodman,
By Justin W. Macklin,
Attorney

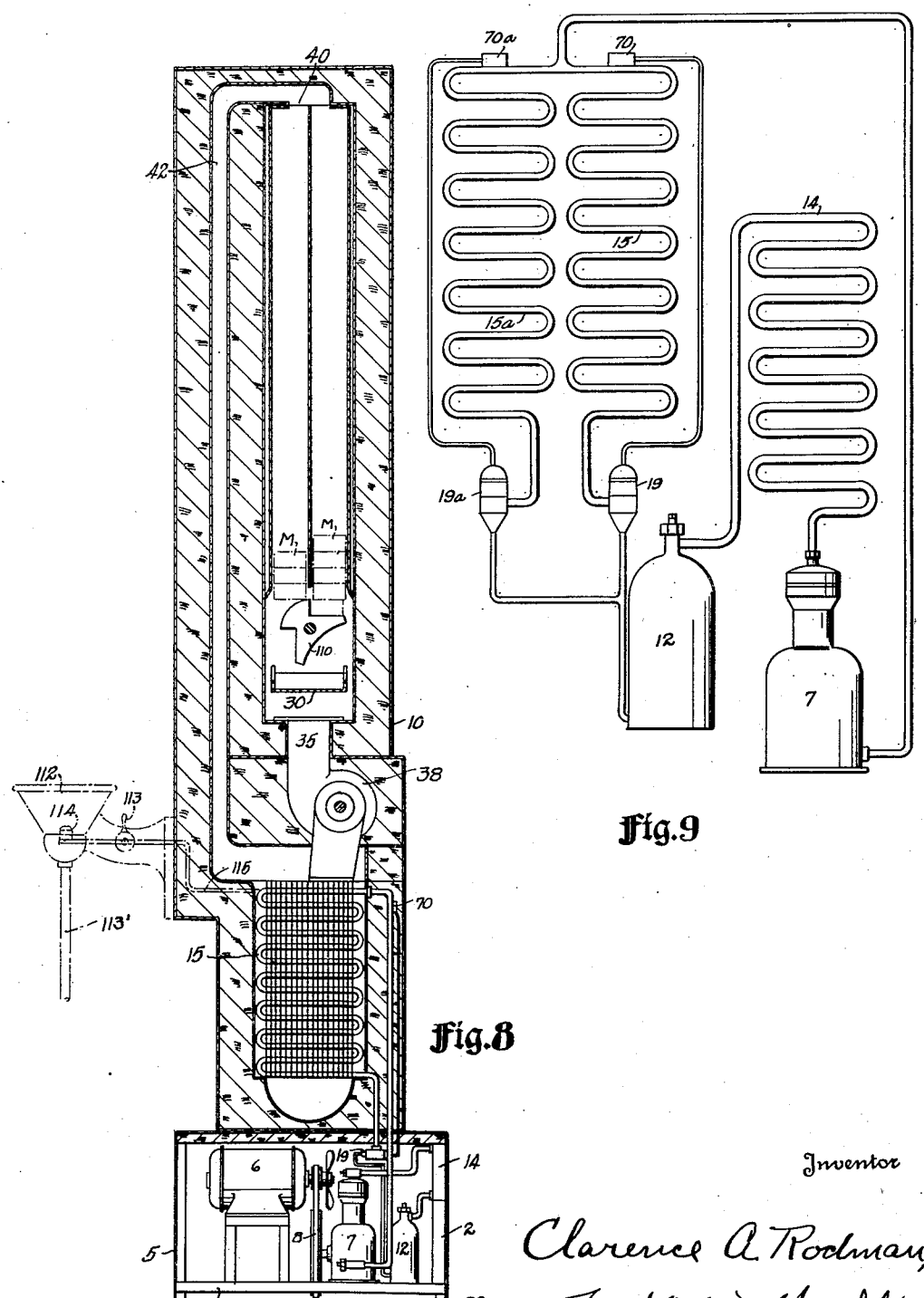

July 30, 1935.   C. A. RODMAN   2,009,817
REFRIGERATING AND DISPENSING APPARATUS
Filed June 21, 1934   6 Sheets-Sheet 5

Inventor
Clarence A. Rodman
By Justin W. Macklin,
Attorney

July 30, 1935.  C. A. RODMAN  2,009,817
REFRIGERATING AND DISPENSING APPARATUS
Filed June 21, 1934  6 Sheets-Sheet 6
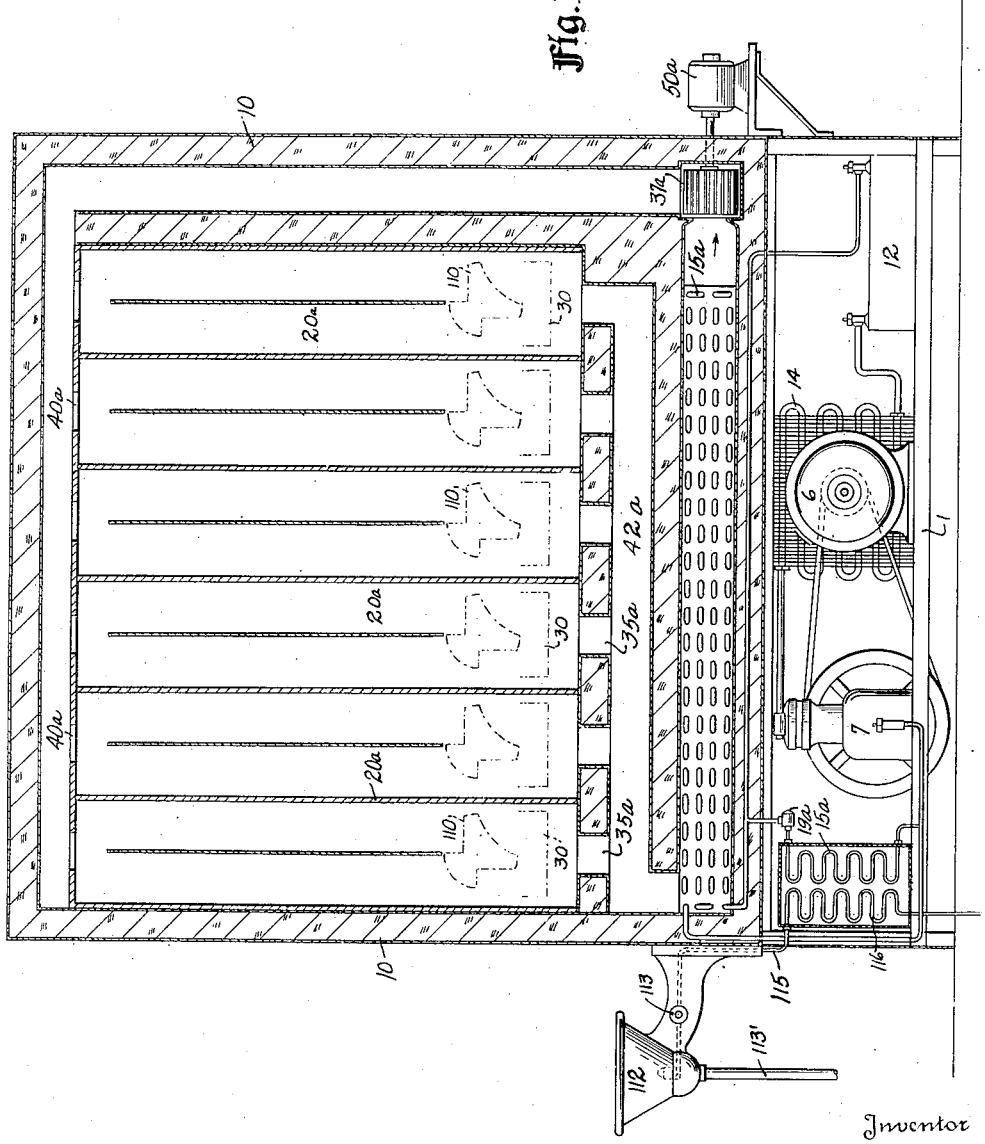
Inventor
Clarence A. Rodman,
By Justin W. Macklin
Attorney Patented July 30, 1935

2,009,817

UNITED STATES PATENT OFFICE 2,009,817

REFRIGERATING AND DISPENSING APPARATUS

Clarence A. Rodman, Detroit, Mich., assignor to John B. Tanner

Application June 21, 1934, Serial No. 731,657

7 Claims. (Cl. 62—116)

This invention relates to a combined dispensing or vending apparatus and air conditioning or refrigerating unit. Broadly, the object of the invention is to provide a simple, efficient, cheaply manufactured equipment for freezing, storing and mechanically dispensing or delivering perishable commodities which, from their very nature, should be kept below a certain temperature, or within certain thermal limits, for proper preservation in marketable and usable form. A further object is to provide such an apparatus, incorporating means for maintaining a desired humidity or predetermined air conditions in the chamber in which the perishable goods are stored.

In the use of vending or "automatic canteen" machines, conditions are frequently met wherein the suitable preservation of certain edibles presents a considerable problem. Thus, if it is desired to dispense from such apparatus commodities such as ice cream or frozen confections very low temperatures must be maintained and at the same time it is highly desirable to maintain precise conditions of humidity.

The present invention, therefore, contemplates the freezing, preserving and delivering of packaged merchandise such as ice cream, icings, etc., frozen confections, chocolate bars and the like, which merchandise must be maintained considerably below freezing, or below the normal atmospheric temperature. At the same time, the depositing of frost on the merchandise or the cold parts of the apparatus and required mechanism must be prevented. This problem is very difficult in coin controlled delivery mechanism because of the frequent opening of the merchandise compartment for delivering merchandise and because of the varying conditions surrounding the containers, and other non-uniform factors which must be met.

It is an object of the invention, therefore, to overcome the above difficulties and meet these problems in an apparatus which may be easily operated and which may be manufactured within the requirements of commercial demands for cheapness of manufacture, convenience of installation, and effectiveness of operation, and having an effective and simple adjustable temperature control means adapted to meet varying conditions.

Another object of the invention is to provide a device of the character described having means to positively circulate the air in the merchandise compartment in order to maintain the desired constant temperature and humid conditions.

A further object of the invention is to so construct the device that it will require no drip drain or plumbing for its installation but which will dispose of its own surplus of moisture in the course of its operation.

Another object of the invention is to effect an automatic defrosting of the refrigerating and cooling coils consequent upon the opening of the merchandise compartment while charging or refilling the compartment with merchandise to be stored and dispensed therefrom.

A further object of the invention is to so construct the machine that air circulation will be automatically discontinued when the storage compartment is opened or, in other words, to prevent the air circulating means from forcing air over the merchandise unless the air is at or below the temperature required in the merchandise compartments, except when defrosting.

Another object of the invention is to provide a device of the character described having a simple yet very effective cooling coil arrangement which is highly efficient in reducing the temperature of the air passing over and through it, and which consists of a tubular member arranged in series or parallel reaches and connecting return bends, by which the efficiency factors in such an evaporator are relatively high as compared to the forms now in general use.

As the operation of such an apparatus depends largely upon the continuity of flow of electric current, failure of which may permit a rise in the temperature of the merchandise, rendering it unsalable or unusable, I may guard against the losses resulting from such failure at least for a substantial period of time, say for a few hours, by the use of a storage tank of brine or other suitable material, this means having no connection with the refrigerator circuit. The tank surrounds the merchandise compartment and becoming substantially as cold as the merchandise compartment affords a "cold storage" unit between the merchandise and the outside air, which because of its bulk and relatively great heat absorbing capacity remains cold for a substantial period and protects the contents of the merchandise compartment.

My invention contemplates the assembly into unitary structures of a plurality of dispensing cabinets through which the conditioned refrigerated air is passed from the common cooling passage and over a common cooling coil. Thus I am enabled to arrange a bank of associated dispensing cabinets and subject them to treatment by a common refrigerating and air conditioning unit.

Inasmuch as the refrigerating unit is seldom if ever called upon to its full capacity, I find that I may utilize the capacity of the machine for still another advantage, namely, that of cooling the water supplied to a drinking fountain associated with the dispensing apparatus. It is therefore an object of the invention to so arrange the device that a separately controlled cooling coil connected in the same system may function to cool the coil through which passes the water supplied to a drinking fountain. This arrangement serves to bring customers more frequently to the location of the dispensing device, the advantage of which is obvious.

The above and further objects will become more apparent in the following description taken in connection with the accompanying drawings, in which Fig. 1 is a vertical section, partly in elevation, through the refrigerating, air conditioning and merchandise dispensing units;

Fig. 3 is a vertical section, partly in elevation through the complete apparatus, taken at right angles to the plane of Fig. 1;

Fig. 4 is a diagrammatic view of the refrigerating circuit;

Fig. 8 is a vertical section somewhat diagrammatically showing a modified form of device provided by my invention and illustrating the assembly with the drinking fountain water supply cooled by the common refrigerating means;

Fig. 9 is a diagrammatic view of the refrigerating circuit for the assembly shown in Fig. 8;

Fig. 12 is a vertical sectional view of the multiple unit device provided by my invention with the drinking fountain assembly associated therewith.

Figure 1:
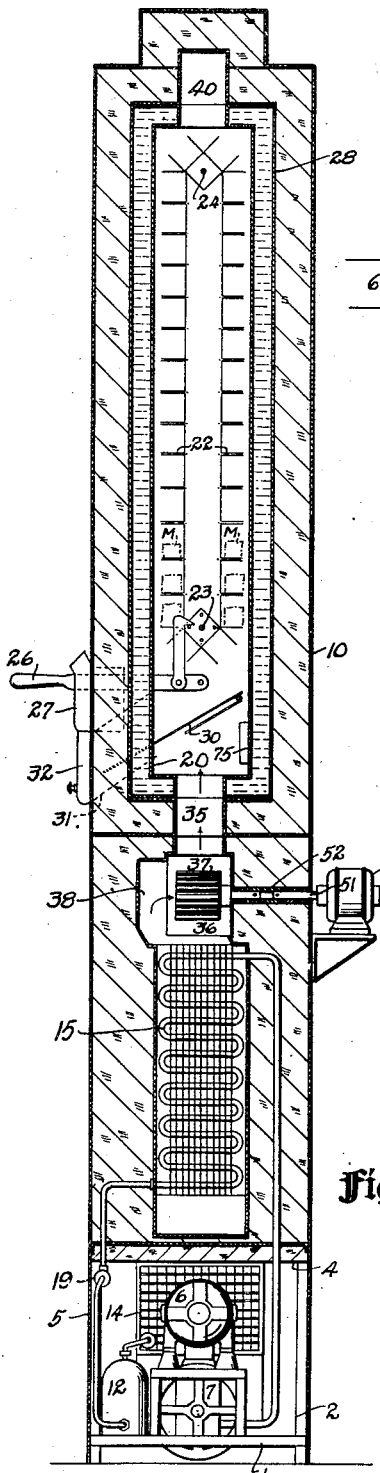

Referring now to the drawings, in the form of the device shown in Fig. 1 there is a suitable frame comprising horizontal elements 1, verticals 2, and horizontal members 3 and 4, and preferably surrounded by an outside casing 5. The frame is shown as supporting the elements of the refrigerating apparatus and as carrying on the top thereof the combined cooling and dispensing apparatus which is housed in an outer casing 10, as shown in Figs. 1 and 3.

Figure 5:
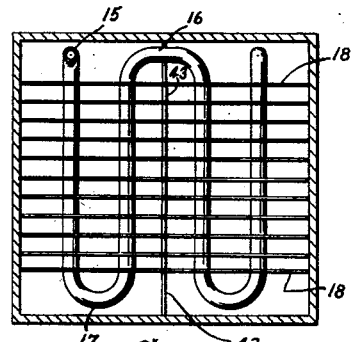
Fig. 5 is an enlarged fragmentary view showing the construction of the cooling coil which I may employ.

The refrigerating unit may be of any suitable construction, preferably of a cheap, compact and durable type, and as shown comprises a motor 6 driving a compressor 7 through a belt 8, the usual liquid storage tank 12 being connected with the condenser coil 14, the coil 14 having the usual connection with the compressor. The expansion or refrigerating coil is of a special design, and its construction is best illustrated in Fig. 5 of the drawings. The expansion coil 15 is shown as comprising a plurality of reaches 16 and return bends 17 which extend outwardly of the heat radiating fins 18 of the chamber for a return portion of the air passage leading to and from the merchandise chamber, as shall be presently described.

It will be noted that the expansion valve 19 is connected in a line connecting the storage tank 12 and one end of the expansion coil 15, while the other end of the expansion coil is connected as usual to the compressor 7.

The merchandise chamber is shown as formed in an upright rectangular housing 20, and it may contain suitable chutes, shelves or other merchandise storing means. I have shown for purposes of illustration a carrier chain indicated at 22 passing over pulleys and suitable shafts 23 and 24, and by way of indicating an actuating and controlling means, I have shown a hook lever 26 under the control of a suitable coin controlled mechanism, not shown in detail, but indicated generally at 27.

In the form of the device shown, I have indicated a jacket of brine between the walls of the housing 20 and parallel walls 28 surrounding the same.

Any suitable means of discharging the merchandise may be used, for example, there is a sloping chute 30 extending downwardly through a discharge opening indicated in dotted lines at 31, this opening being closed by one or more doors, an outer door being indicated at 32.

Through the bottom of the brine jacket and bottom wall of the housing 20 is a tubular passage 35 connected with a chamber 36 surrounding a fan designated at 37 preferably of the radial blade or "sirocco" type, the air passing through this fan coming through an enlargement of the passage at 38 and into the center of the fan and upwardly, as indicated by the arrows there shown.

The upper end of the chamber is open to a passage 40 which extends laterally and downwardly, as at 42 to the casing 18, surrounding the cooling coil 15. A partition member 43 causes the air to pass downwardly over one-half of the coils and then upwardly at the right of this partition (see Fig. 3) to the fan 37. The fan 37 may be driven by a suitable motor 50 connected by a shaft 51 with the fan and being supported and connected by an insulating sleeve 52, thus effectively preventing transmission of heat from the motor to the fan and thence to the air flowing over the merchandise.

The fan is preferably low speed, in order that it will not, by its action on the air, cause any appreciable rise in the temperature of the air.

It will be noted that the air passes through the spaces between the return reaches 16 of the expansion coil 15 and the fins 18 first downwardly along the left-hand side of the expansion coil (Fig. 3), and thence upwardly through the similar reaches and fins on its path to the fan 37. The cooling of the warmed air a very marked degree during this passage and the causing of it to thoroughly contract with the large area surfaces of the tubes and fans has the effect of eliminating or gathering moisture to the degree desired, namely such that the air is not made too dry whereby it would dry the merchandise. On the other hand it is sufficiently moisture-free that no frost deposits occur upon the merchandise or merchandise carrying mechanism.

Actual operation of the machine has shown that with a merchandise compartment substantially eight inches square and with expansion or cooling coil arrangements in which the down and up passages are approximately 1 to 2 feet, each preferably about 18 inches, has proven to have the most desirable commercially effective results. In the installation referred to the 8 inch square merchandise compartment is between 3 and 4 feet high so that there is between 1 and 2 cubic feet, i. e. about 1½ cubic feet of air being circulated in the system, that is, in the merchandise compartment and return passage and passages through the refrigerating or cooling coils and fan passage.

The return of flow of the air is several times a minute and its temperature for most desirable results is materially below zero as it leaves the cooling coil and approximately a zero temperature, but actual charting of commercially operated devices is found to be from 2° or 3° below zero, to say 8° maximum above zero in the merchandise compartment. As indicated, the rate of rotation of the fan 37 may be varied to suit conditions, amount of merchandise, and would of course vary with the nature and size of fan used. However, a fan of about the proportions shown in the drawings rotated at a few hundred R. P. M., about 400 R. P. M. being satisfactory, has been found to give commercially satisfactory results.

Figure 6:
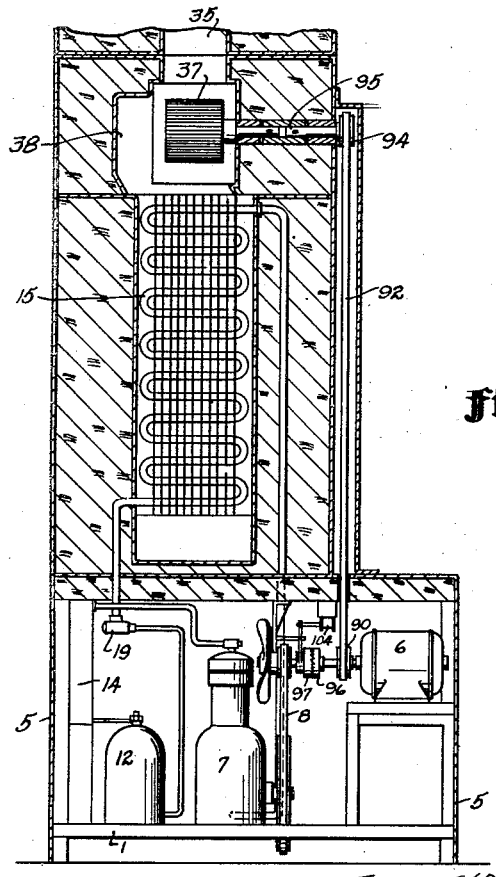
Fig. 6 is a partial sectional view showing a modified form of the device provided by my invention.

As shown in Fig. 6, I may so arrange the fan drive as to eliminate the use of the motor 50 and its consequent likelihood of heat transmission to the refrigerated air. In the modified form shown in Figs. 6 and 7 I have shown arranged on the shaft of the motor 6 a belt pulley 90 over which runs a belt 92 shown as driving at its upper end a larger pulley 94 on the shaft 95, carrying the fan 37. The pulley 90 which carries the belt 92 is driven directly on the shaft of the motor, whereas the belt 8 is driven by a pulley which may be connected or disconnected from the motor shaft by clutch means in order that air may continue to be circulated, to effect defrosting of the cooling coils at the time when the belt driving the compressor 7 is rendered inoperative.

Figure 7:
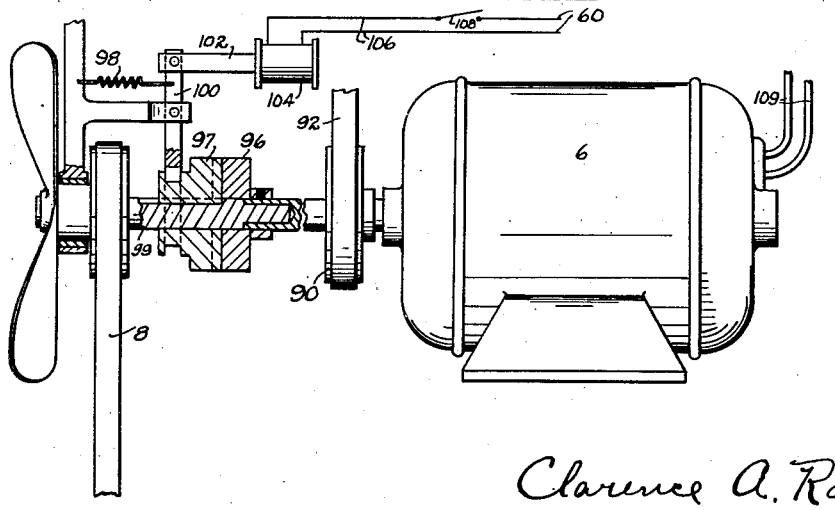
Fig. 7 is a fragmentary diagrammatic view showing the clutch control employed with the form of device shown in Fig. 6.
Figure 10:
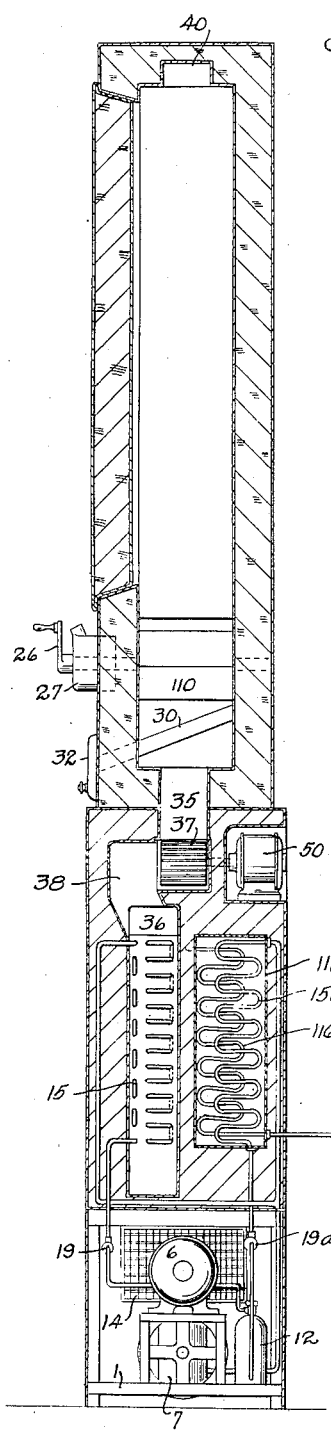
Fig. 10 is a vertical section taken at right angles to the plane of Fig. 8.
Figure 11:
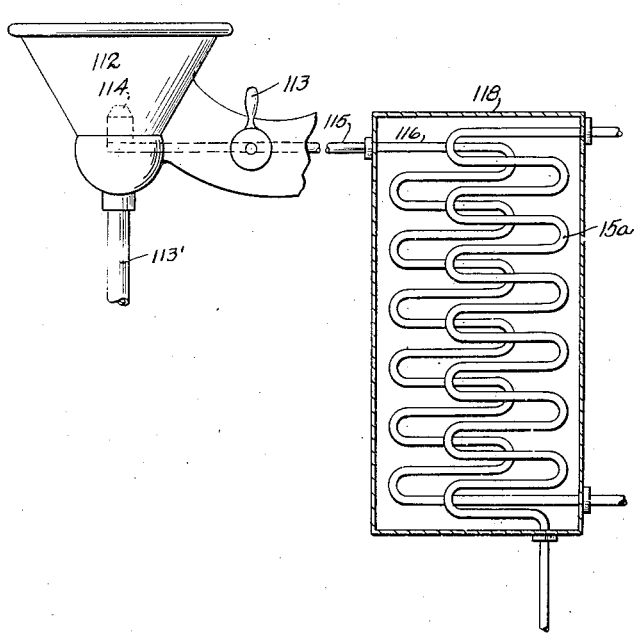
Fig. 11 is an enlarged cross sectional view of the water cooling tank employed in the form of the device illustrated in Fig. 8.

A suitable clutch arrangement is illustrated schematically in Fig. 7 wherein two elements 96 and 97 of the clutch means are normally urged together by a spring 98 to drive the extension 99 carrying the pulley driving the belt 8. The clutch member 97 may be actuated by the swinging yoke 100 connected with a solenoid armature 102 of solenoid 104. The solenoid is adapted to be energized by the wires 106 connecting the wires 60 through a switch 108 closed when the front cover or door 29 is opened. The result of this is that the refrigerating system is disconnected while the circulating fan continues to run, there being wires 109 leading to the motor 6. When warm air enters the dispensing chambers, as a result of the door to the merchandise compartment being opened, the air will be circulated through the merchandise chamber and over the cooling oil, or pass over the other parts under the influence of the fan for a brief time, that is a few minutes, during which time the compressor and correspondingly the evaporator remains idle. This warm air will melt any frost which may have formed in the merchandise compartment or elsewhere, and will result in some moisture which will drain from the parts of the merchandise carrying means and the coils 15 to the pan 105 at the bottom of the condenser 14, where it is subjected to the warmth of the condenser and in turn pass off into the atmosphere.

In the modified form shown in Fig. 8 I have indicated a dispenser or discharge control in which the merchandise packages are indicated at M, as also shown in Fig. 1. An oscillating gate of common construction indicated at 110 controls the delivery of individual pieces of merchandise on a discharge chute indicated in broken lines 30. It will be noted that here the merchandise is in two columns and moved downwardly to the controlling gate by gravity.

At 112 is indicated a drinking fountain controlled by any suitable valve 113 and having a drain pipe 113'. The water pipe leading to the fountain jet 114 is shown at 115 and passes through a series of convolutions or return bends in the nature of a coil indicated at 116, and which is preferably disposed in a suitable tank of brine or the like indicated at 118. A separate portion of the expansion coil indicated at 15a is passed through this same tank as shown in Fig. 9, and is connected in parallel with the passage leading from the condenser 7 and returns through its own expansion valve 19a to the storage chamber 12. A thermostatic control device 70a is connected with the inner portion of the return or expansion coil 15a on the return side where it leaves the brine tank 118, so that the temperature of the coils in the brine and the conditions controlling the drinking fountain temperatures may be governed by the action of the expansion valve 19a. Similarly the expansion valve 19 is controlled by the conditions in its coil 15 effecting the cooling of the merchandise chamber. Here as before the refrigerant passes from the storage tank to the evaporator coils 15 and thence to the compressor 7.

In Fig. 12 I have shown a suitable arrangement of a multiple unit device which is illustrative of many forms and has the essential characteristic that a bank of distributing and dispensing units are treated by circulated and conditioned refrigerated air and preferably having a common expansion coil chamber through which the air is returned from the merchandising compartments to the fan and again passed over the merchandise after being lowered in temperature, and while being continuously conditioned. In such an arrangement a series of units such as heretofore described and designated 20a are mounted side by side and encased in common insulating top, bottom, and side walls 10, and having front and back walls covered with insulation, preferably of the same character and thickness, although in some installations it may be required to be thinner.

A common passage to series of openings as at 40a leads to the individual compartments, whereas the openings 35a in the bottoms of the individual compartments serve to permit the air to be brought to the common return passage 42a extending horizontally across and below the dispensing or storage compartments. Arranged horizontally and of sufficient size to effectively accomplish the necessary cooling of the air are the expansion coils 15a to which the air is led at the left hand end of the passage as indicated by the arrow, and from which the passage to the fan element 37a is of sufficient capacity to pass the amount of air required to cool the merchandise compartments. This fan is shown as mounted on the inner end of the shaft of the motor 50a and has a suitable insulating sleeve fitted between the motor and the fan.

The multiple unit device illustrated in Fig. 12 may be provided with a drinking fountain, if desired, the fountain being arranged in the same manner as the fountain which is described in detail in connection with the form of the device shown in Fig. 8.

Figure 2:
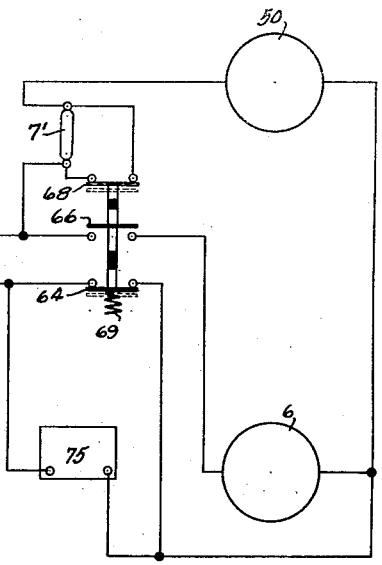
Fig. 2 is an electrical diagram showing the circuits to the motors and the controlling switches.

The electrical diagram of Fig. 2 is illustrative of an optional arrangement whereby the compressor motor and blower motor may be separately controlled. The line wires indicated at 60 may energize either or both of the motors 6 and 50. In addition there is a combination switch member having three closing elements 64, 66 and 68 arranged in the positions shown in solid lines where the door 29 is opened. The current may pass through the switch element 68 thence through the blower motor, and through element 64 to the line.

A thermal switch 7' having its control bulb in the return air stream at the entrance to the evaporator may control the blower motor. However, the circuit to the blower motor may be closed either through this element 7' or element 68.

The switch elements 64, 66 and 68 are shown as insulated from each other but rigidly connected together and are urged by the spring upon opening the door, to the position shown in solid lines, but the switch elements are intended to be depressed to close the element 66, and to open the other two switch elements upon the closing of the door to the merchandise compartment. When the door 29 is opened, with the result that warm air enters the merchandise chamber, raising the temperature in the merchandise chamber, the blower will continue to operate, even though the thermal switch 7' opens its circuit, thus causing warm air to flow through the apparatus and over the coils 15 for a few minutes, effectively defrosting the coils and merchandise carrying and delivering means, if any.

On the closing of the door, however, the spring 69 will move the switch to the position to close the element 66, opening the other switch elements, thus putting the compressor motor in a circuit in series with the thermal switch 75, which is responsive to the temperature of the air in the merchandise compartment. In this condition the blower motor is under the control of the thermal switch 7', the switch element 64 being in the open position.

From the foregoing description it will be seen that I have provided a simple, efficient, combined dispensing, vending and air conditioning or refrigerating unit. I have found in practice that it is effective in operation and may be cheaply manufactured. Various modifications and alterations in shapes, proportions and in detailed constructions may be made without departing from the spirit of my invention and I do not wish to be limited otherwise than according to the scope of the appended claims.

I claim:—

1. In an apparatus of the class described, a chamber having a normally closed delivery opening, a merchandise dispensing mechanism associated therewith for bringing merchandise articles to said opening, the chamber walls having air inlet and exhaust orifices therein, one orifice being positioned adjacent the top of the chamber and the other orifice being positioned adjacent the bottom of the chamber, a passage outside of said chamber connecting said inlet and exhaust orifices, a refrigerating unit having its heat absorbing element disposed in said passage, and means associated with said passage for effecting a forced circulation of air through said passage from the exhaust orifice of the chamber to the inlet orifice of the chamber, whereby air is circulated through the chamber and over the heat absorbing element of the refrigerating unit.

2. In an apparatus of the class described, a chamber having a delivery door and having a movable merchandise dispensing mechanism for delivering merchandise from said door, the chamber walls having inlet and exhaust orifices therein, a fluid passage outside of said chamber connecting said inlet and exhaust orifices, a refrigerating unit having its heat absorbing element disposed along said passage, and a fan associated with said passage for effecting a forced circulation of air through said passage from the exhaust orifice to the inlet orifice of the chamber, whereby air is circulated through the chamber and over the heat absorbing element of the refrigerating unit.

3. In an apparatus of the class described, a chamber having an article dispensing mechanism associated therewith and an opening to which articles are delivered thereby, the chamber walls having inlet and exhaust orifices therein, a passage for cooling fluid connecting said inlet and exhaust orifices, a refrigerating unit having its heat absorbing element disposed in said passage, a fan associated with said passage for effecting a force circulation of air through said passage from the exhaust orifice to the inlet orifice of the chamber, whereby air is circulated through the chamber and over the heat absorbing element of the refrigerating unit, means for driving said fan, and means responsive to temperature conditions in the chamber and controlling the means for driving the fan and operable to interrupt operation of the fan on an increase in the temperature in the chamber above a predetermined value.

4. In an apparatus of the class described, a chamber having a normally closed delivery opening and inclosing a merchandise dispensing mechanism for delivering articles to said opening, the chamber having walls including a jacket of heat absorbing material the chamber walls having inlet and exhaust orifices therein, an air passage outside of the chamber connecting said inlet and exhaust orifices, a refrigerating unit having its heat absorbing element effective to cool air in said passage, and means associated with said passage for effecting a forced circulation of air through said passage from the exhaust orifice of the chamber to the inlet orifice of the chamber, whereby air is circulated through the chamber and over the heat absorbing element of the refrigerating unit.

5. In an apparatus of the class described, a normally closed chamber having merchandise storing and dispensing mechanism therein, the chamber having an opening to which the merchandise is delivered and a door therein adapted to be opened to permit merchandise to be placed in the chamber, the chamber walls having inlet and exhaust orifices therein, an air conduit outside of said chamber and connecting said inlet and exhaust orifices, a refrigerating unit having its heat absorbing element effective to cool air in said conduit, a fan effecting a forced circulation of air through said conduit and chamber, means for driving said fan, means for driving the refrigerating unit, and means associated with the door to the chamber and operable on movement of the door to effect operation of the means driving the fan, and to effect interruption of the operation of the means for driving the refrigerating unit.

6. In an apparatus of the class described, a normally closed chamber having an opening and a removable storing mechanism adapted to deliver mechandise to said opening, the chamber having a door adapted to be opened to permit merchandise to be placed in the chamber, the chamber walls having inlet and exhaust orifices therein, a passage outside of the chamber connecting said air inlet and exhaust orifices, a refrigerating unit having its heat absorbing element arranged to cool the air in said passage, a fan associated with said passage for effecting a forced circulation of air through said passage and said chamber, means for driving said fan, means responsive to temperature conditions in the chamber and operable to interrupt the operation of the means driving the fan on an increase in the temperature in the chamber above a predetermined value, and means associated with the door to the chamber and operable on movement of the door to the open position to effect operation of the means driving the fan irrespective of the means responsive to the temperature conditions in the chamber.

7. In an apparatus of the class described, a normally closed chamber having merchandise dispensing mechanism associated therewith said chamber having a merchandise delivery opening, and said chamber having a door adapted to be opened to permit merchandise to be placed in the chamber, the chamber walls having inlet and exhaust orifices therein, a passage outside of the chamber connecting said inlet and exhaust orifices, a refrigerating unit having its heat absorbing element associated with said passage, a fan associated with said passage for effecting a forced circulation of air through said passage and said chamber, means for driving the fan and for driving the refrigerating unit, means responsive to the temperature conditions in the chamber and operable to interrupt the operation of the means driving the fan on an increase in the temperature in the chamber above a predetermined value, and means associated with the door to the chamber and operable on movement of the door to the open position to effect operation of the means for driving the fan irrespective of the operation of the means responsive to temperature conditions in the chamber, the means associated with the door being operable also when the door is moved to the open position to interrupt operation of the means driving the refrigerating unit.

CLARENCE A. RODMAN.